Oct. 15, 1968  W. F. COUSINO  3,405,577
APPARATUS FOR CUTTING OFF ELONGATED MATERIALS
Filed Nov. 14, 1966  2 Sheets-Sheet 1
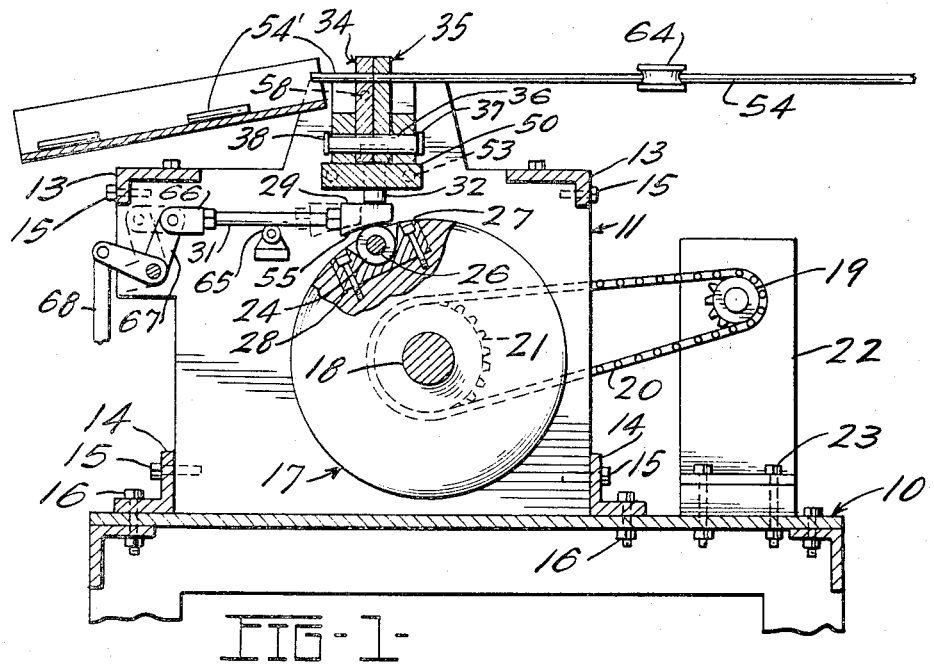
FIG-1-
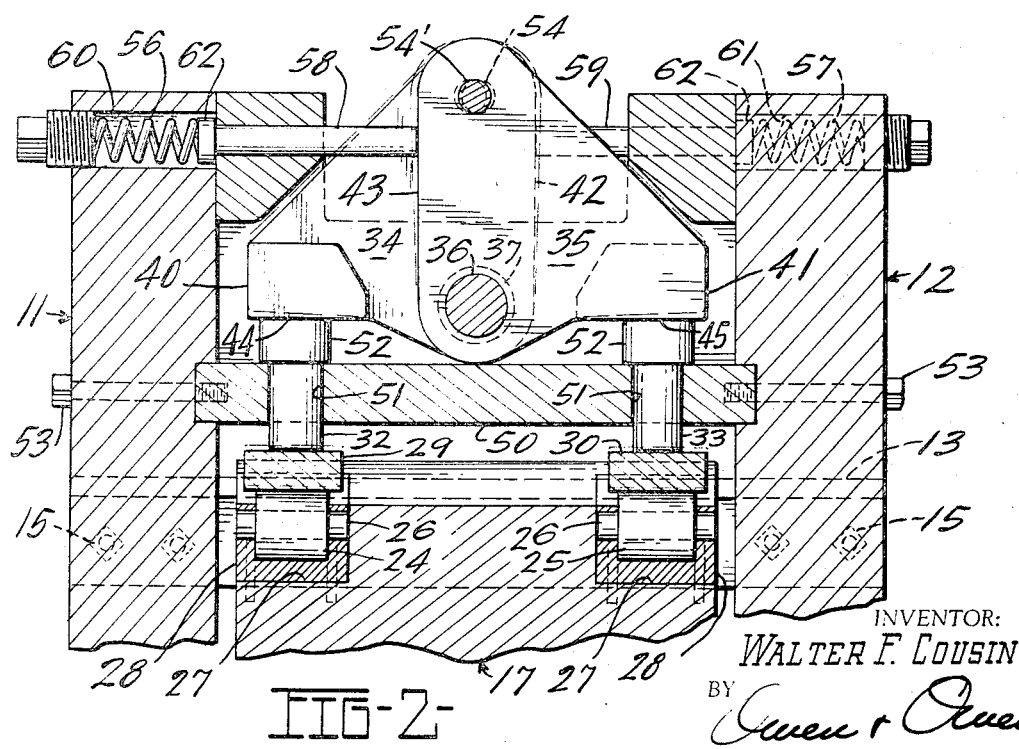
FIG-2-
INVENTOR:
WALTER F. COUSINO.
BY
ATT'YS.

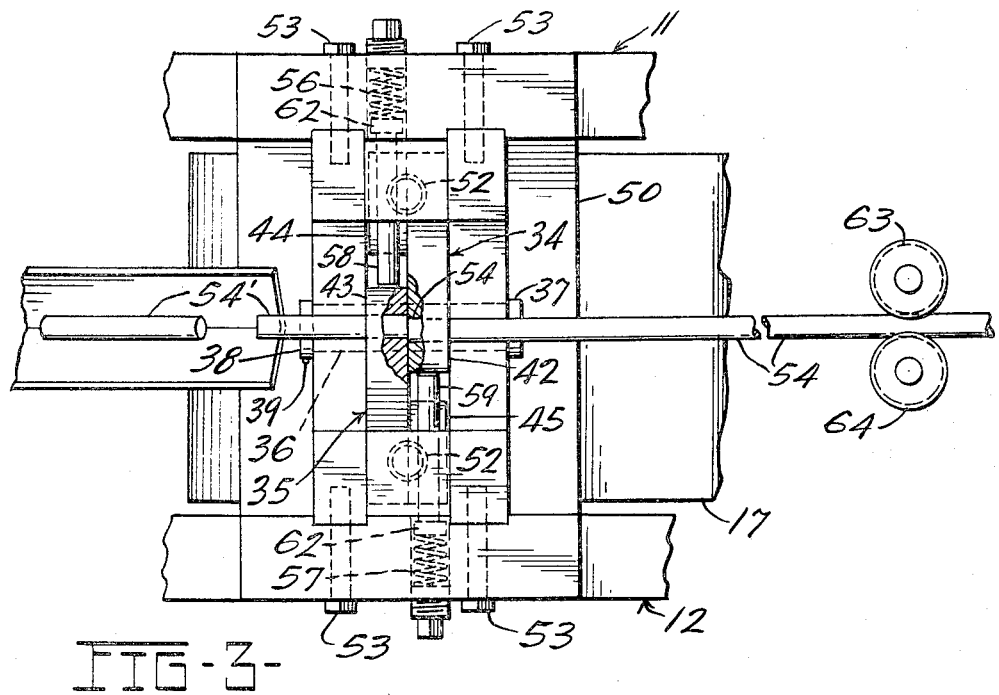
FIG-3-
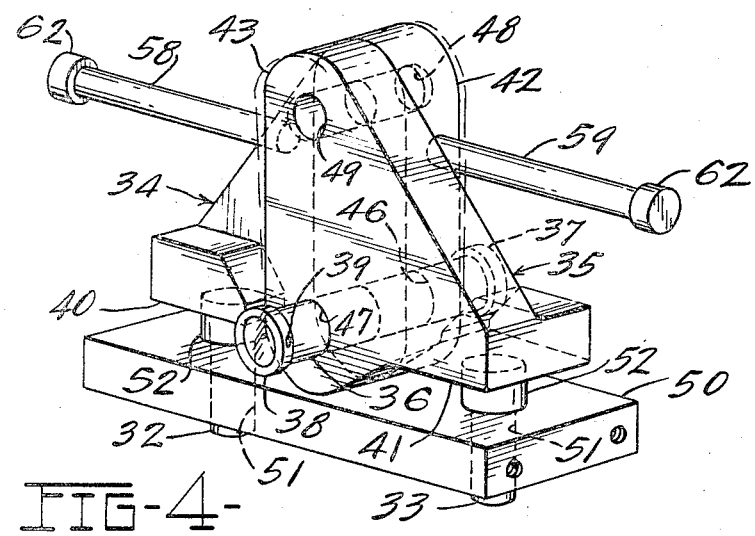
FIG-4-
INVENTOR:
WALTER F. COUSINO.
BY
ATT'YS.

United States Patent Office 3,405,577
Patented Oct. 15, 1968

3,405,577
APPARATUS FOR CUTTING OFF
ELONGATED MATERIALS
Walter F. Cousino, Toledo, Ohio, assignor to Champion Spark Plug Company, Toledo, Ohio, a corporation of Delaware
Filed Nov. 14, 1966, Ser. No. 593,993
8 Claims. (Cl. 83—1)

This invention relates to apparatus for cutting off elongated materials such as bar stock, tubing, angles, and shapes of various cross sections, and more particularly to apparatus for cutting off such elongated materials by high impacts applied simultaneously to substantially opposite sides of the material, as contrasted to shearing.

In my U.S. Patent 3,089,368 there is disclosed an apparatus and method of cutting off bar stock, tubing, angles, and shapes of various cross sections. In that patent it is taught that such an elongated material can be cut off cleanly along a plane perpendicular to its length by delivering to the object to be cut a sharp high impact blow simultaneously from both sides. The cutting off is postulated to result because the impact generates a cleavage line along the plane in which it is delivered and propagates the break or cleavage line cleanly across the full extent of the material. By propagating a clean cleavage line, the material is cut off in the plane of the force propagation without burrs or deformation of the cross-sectional shape of the material being cut.

The apparatus and method for cutting elongated materials described in U.S. Patent 3,089,368 is a very excellent means of cutting material and eliminating burrs and deformation which normally occur as a result of conventional shearing operations.

A problem sometimes occurs, however, in delivering the impact blow from both directions simultaneously to the bar stock or other material to be cut. This arises because the hammers which deliver the blow (one on each side) are synchronized with the driving motor indirectly by a series of chains and sprockets which are susceptible to wear and deterioration, and because of such wear the hammers can become non-synchronous enough so that the blows from opposite directions are not delivered precisely simultaneously. This results in malfunction of the device and the bar stock or other elongated shapes are not cleanly severed.

The instant invention is directed to apparatus for delivering sharp high impact blows or moments of force simultaneously from opposite directions to bar stock and similar materials which is so constructed that the hammers which deliver the blows are actuated directly from a common revolving impact drum, thus assuring more nearly perfect synchronization of the opposing blows than has heretofore been possible.

As used herein the term "elongated stock" refers to bars, strips, tubes, rods, angles and other shapes of plastics, metals or other solid material, and the term is intended to be inclusive of solid and hollow materials as well as those of irregular and angular cross sections.

It is a principal object of this invention to provide an apparatus for cutting off elongated stock by the delivery thereto of simultaneous sharp impacts at reactive points angularly spaced resulting in opposed major components of force in a plane perpendicularly to the longitudinal extent of the material being cut off.

Further objects and advantages of the apparatus embodying the invention will be better understoond from the following specification and from the drawings in which:

FIG. 1 is a view partly in elevation and partly in section with parts broken away, of an apparatus embodying the invention;

FIG. 2 is a fragmentary view partly in elevation and partly in cross section of impact delivery means of the apparatus of FIG. 1, and shown on an enlarged scale;

FIG. 3 is a fragmentary plan view of the apparatus shown in FIG. 1, with some parts broken away; and FIG. 4 is a perspective view of the impact delivering means of the apparatus shown in FIG. 1, with parts removed to more clearly show the elements of the mechanism.

The apparatus embodying the invention includes a main frame having a base plate 10 upon which are erected heavy, spaced, side plates 11 and 12, the side plates 11 and 12 being held in parallelism by angle brackets 13 and 14 which extend horizontally between the plates 11 and 12 at their upper and lower ends, respectively, and are secured thereto by bolts 15. The side plates 11 and 12 are also rigidly mounted on the base plate 10 by bolts 16 which extend through the horizontal arms of the angle brackets 14.

An impact drum 17 is mounted for rotation by a heavy horizontal shaft 18, to which it is keyed. The shaft 18 is journaled for rotation by heavy bearings (not shown) which are mounted in pairs by the plates 11 and 12. The shaft 18 is rotated by a drive mechanism (FIG. 1) having an output sprocket 19 which is connected by a drive chain 20 to a drive sprocket 21 secured on the rear end of the shaft 18. A housing 22 for the drive mechanism is mounted on the base plate 10 by bolts 23.

The impact drum 17 is a massive member constructed from a heavy material, such as cast iron, for rigidity, and to provide inertia which can be stored during each rotation for delivery of a heavy impact. The drum 17 has at least one pair of impact delivery rollers 24 and 25, which are mounted by heavy axially extending pins 26 in recesses 27 in the periphery of the drum 17. Each of the pins 26 and its roller 24 or 25 is retained in the respective recess 27 by a mount 28 which is held in place in the recess 27 by a plurality of machine screws extending into the drum 17. As can best be seen in FIG. 1, the peripheries of the rollers 24 and 25 protrude radially beyond the surface of the drum 17.

The impact drum 17, through its delivery rollers 24 and 25 delivers simultaneous high impact blows, for each revolution, to force transfer pads 29 and 30, each of which is mounted on a horizontally slidable arm 31, and movable to and from a force transferring position (shown in full lines), adjacent the drum 17 and in line with the respective one of the delivery rollers 24 and 25. When in the force transferring position (FIG. 1), each pad 29 or 30 contacts the bottom end of one of a pair of vertically disposed push pins 32 and 33, these in turn being in contact with the bases of a pair of opposed, overlapping, bell crank impact hammers 34 and 35. The hammers 34 and 35 are mounted for opposed rocking movement on a common axis by means of a heavy trunnion 36 which passes through the lower medial base of each of the hammers 34 and 35. The trunnion 36 is held in place at one end by a flange 37, and at the other end by a movable flange 38 equipped with a set screw 39.

If desired, the drum 17 may have more than one set of impact rollers on each end in order to deliver more than one impact per revolution thereof.

The hammers 34 and 35 are identical to each other, but are oppositely mounted, being held together by the trunnion 36 and resting on the upper ends of the push pins 32 and 33. Each of the hammers 34 and 35 is generally triangular in shape, having a horizontal, outwardly extending arm 40 or 41 and a vertically extending arm 42 or 43. On the bottom surface of each of the horizontally extending arms 40 or 41 and at the outer end thereof, is located an impact pad 44 or 45. Each of the hammers 34 or 35 is pierced by two bores, one bore 46 or 47 being located at the lower ends of the vertical arms 42 or 43 and inner ends of the horizontal arms 40 or 41. The heavy trunnion 36 extends through the bores 46 and 47. Each of the hammers 34 or 35 also has a bore 48 or 49 at the upper end of the vertically extending arm 42 or 43 for the reception of the piece of elongated material which is to be cut off.

The push pins 32 and 33 rest on the top surface of a support plate 50, and extend through bores 51 in the support plate 50 with their bases in contact with force transfer pads 29 and 30. The upper ends of the pins 32 and 33 have enlarged heads 52 which engage the impact pads 44 or 45 of the hammers 34 and 35. The support plate 50 is mortised into the side plates 11 and 12 and is held in place by bolts 53 extending through the side plates 11 and 12. The plate 50 supports the push pins 32 and 33 and the hammers 34 and 35, the lowermost medial portions of which (below the trunnion 36) lie on the plate 50 when the mechanism is at rest.

The vertically extending arms 42 and 43 of the hammers 34 and 35 (FIGS. 2 and 4) have flat, vertical, adjacent sides which contact and are overlapped with each other, forming mutually engaging surfaces which lie in and determine the vertical, transverse stock severing plane of the hammers 34 and 35. The hammers 34 and 35 are overlapped for an area extending to approximately ⅓ of their width or at least of sufficient area to insure mutual contact of the edges of the bores 48 and 49.

The embodiment of the apparatus shown in the drawings is designed for the purpose of cutting off round, solid, bar stock and therefore the bores 48 and 49, in the upper medial section of the hammers 34 and 35 are circular in shape. The bores 48 and 49 are aligned at rest position for the reception of a bar of stock 54. The diameter of the bores 48 and 49 is only slightly larger than the outside diameter of the stock 54 shown in position in the drawings, and permits sliding movement of the stock 54 as it is fed therethrough between impacts.

If the elongated material to be cut off has other than a circular cross section, then in place of the bores 48 and 49, the hammers 34 and 35 would be transversely pierced with openings complementing the cross section of the stock to be cut off. For example, if the stock to be cut off were an angle iron, then the two hammers 34 and 35 would be pierced with a transversely extending angular opening; if the stock were hexagonal, then the bores would be similar, etc. If the bar stock to be cut off were tubular, then bores such as the bores 48 and 49 would be utilized with the diameter thereof being but slightly larger than the outside diameter of the tubular stock to be cut off and inner mandrels would also be used, as taught in my Patent No. 3,089,368.

Because the hammers 34 and 35 rest on the support plate 50 and the heads of the pins 32 and 33, they are easily removable and additional hammers may be provided for various sizes and cross-sectional configurations of different types of bar stock to be cut off upon apparatus embodying the invention. By substituting one set of hammers for another, a single machine may be modified to handle elongated materials of many different cross sections. The particular selection of a solid circular bar stock for purposes of illustration herein is not intended to limit the utilization or scope of the invention in any manner.

When the impact drum 17 is rotated, as described above, the impact delivery rollers 24 and 25 strike undersurfaces 55 of the transfer pads 29 and 30 and the impact is delivered through the vertically extending push pins 32 and 33 to the impact pads 44 and 45 on the outer ends of the bases of the two hammers 34 and 35. The force causes the hammers 34 and 35 to swing inwardly in opposite directions around the trunnion 36, and the impact is delivered through the walls of the bores 48 and 49 engaging the bar stock 54 in the plane established by the overlapped sides of the hammers 34 and 35. A clean planar line of cleavage is propagated transversely across the bar stock 54 by movement of the hammers 34 and 35 only to the extent of about five to seven percent of the diameter thereof. The hammers 34 and 35 do not move relative to each other a distance sufficient to shear the bar stock in the manner of opposed knives or shears of the prior art. In FIG. 3, the hammers 34 and 35 are illustrated as being at the inner limits of their movement and a severed piece of bar stock 54 is shown as being displaced laterally with respect to the main piece of bar stock 54. The degrees of displacement illustrated in FIG. 3 is not intended to show the actual displacement occurring during a cutting off operation, but is only illustrative of the movement which takes place (to a lesser degree) at the time of the delivery of the impact.

It will be appreciated that the initial reactive forces which the bar stock is subjected to do not come from precisely opposite directions, due to the angular movement of the hammers 34 and 35. However, resultant major components of force are applied to opposite sides of the bar stock in the plane along which the stock is to be cut off. It is these components of force which enables the bar stock to be cut cleanly with no burrs remaining.

The angular movement of the hammers 34 and 35 is controlled by two mechanisms. The first of these functions to return the impact hammers 34 and 35 outwardly after the delivery thereby of an impact to the elongated stock being cut. This return mechanism comprises a pair of springs 56 and 57 (FIG. 2) and associated spring plungers 58 and 59 for the respective one of the hammers 35 or 34. The springs 56 and 57 (FIG. 2) are positioned in horizontal recesses 60 and 61 bored in the side plates 11 and 12. The plungers 58 and 59 are engaged, at their inner ends, in notches (not shown) cut in the sides of the impact hammers 35 and 34, and at their outer ends in the recesses 60 and 61 in the side walls. The plungers 58 and 59 have enlarged heads 62 contacting the coiled springs 56 and 57 which urge the plungers 58 and 59 inwardly. The springs 56 and 57 are compressed by the inward movement of the hammers 35 and 34 at the time of impact delivery and, immediately thereafter, expand, pushing the plungers 58 and 59 inwardly to swing the hammers 35 and 34 outwardly.

Outward movement of the hammers 34 and 35 is limited by the enlarged heads 52 of the push pins 32 and 33 (FIGS. 2 and 4) which engage the top surface of the support plate 50 with their respective bores 48 and 49 aligned with each other. When hammers 34 and 35 having bores of different configurations are employed, the pins 32 and 33 are re-adjusted or replaced with other appropriate pins to establish alignment of the bores therein.

After each cut-off operation, i.e., after each delivery of an impact from the impact drum 17 through impact delivery rollers 24 and 25, force transfer pads 29 and 30, and push pins 32 and 33 to the hammers 34 and 35, the bar stock 54 is fed axially through the bores 48 and 49 a distance corresponding to the length of the piece to be cut off. A suitable feeding mechanism, for example, comprises grooved feeding rollers 63 and 64 driven by a variable speed mechanism as taught in my Patent 3,089,368, including an index wheel graduated in inches, so that the operator may rotate the index wheel to change the gear ratio and thus the ratio of the drive between the impact delivery shaft and the stock feeding rollers to advance the stock the selected distance between impacts. The particular stock feeding mechanism selected to be employed with apparatus embodying the invention is not material, it being necessary only that the stock feeding mechanism be designed and adapted to feed the stock longitudinally a selected distance between successive impacts.

Referring to FIG. 1, each of the force transfer pads, for example, pad 29 is mounted on the inner end of its arm 31 and the sliding arm 31 is supported by a roller 65 and connected by a clevis 66 to an arm of a bell crank 67 mounted on the respective side plate 11 or 12. The other arm of the bell crank 67 is connected to a rod 68.

In normal operation the force transfer pads 29 and 30 are positioned so that they are clear of the surface of drum 17 and are only contacted by the impact delivery rollers 24 and 25 which occurs once per revolution of impact delivery drum 17. If it is desired to allow the drum 17 to revolve without impacts, then the force transfer pads 29 and 30 are withdrawn from their active (full line) position to the broken line position (FIG. 1) by means of rod 68 (FIG. 1), that is connected to an appropriate control mechanism. Such free revolution may be desirable when first energizing the mechanism in order to build up inertia in the drum 17 and also after a length of bar stock 54 has been cut into short pieces and while a new bar is being moved into position to be fed through the mechanism. The underfaces 55 of the force transfer pads 29 and 30 have curved contours which are eccentric to the drum 17. The underfaces 55 may indeed have an increasing rate of curvature to accelerate their displacement by the rollers 24 and 25. Therefore, the path of movement of the outer surfaces of the impact rollers 24 and 25 and the underfaces 55 are converging, so that, as is best seen in FIG. 1 when the impact rollers, for example, roller 24, moves into engagement with the underfaces 55 of the pad 29 it violently thrusts the pad 29 vertically and, therefore, through push pin 32, the hammer 34 inwardly (FIG. 2).

While the particular speed of rotation of the drum 17 is not critical, it should be rotated at sufficient speed so that the inward angular movement of the hammers 34 and 35 takes place in a very small fraction of a second. For example, if the drum 17 is rotated at 300 r.p.m., and has a diameter of, say, 20 inches, the rollers 24 and 25 travel at a speed of about 300 inches per second. The arcuate underfaces 55 of the pads 29 and 30 might be one inch in length and in contact with the rollers 24 and 25 for, say, ¼" to ½". Under these conditions, the actual hammer movement would take place in less than $\frac{1}{600}$ part of a second. With the two opposed hammers 34 and 35 moving simultaneously, the impact has less than one one-thousandth of a second effective duration.

Having described my invention, I claim:

1. Apparatus for cutting off elongated stock comprising in combination, a pair of offset, opposed, bell crank impact hammers pivotally mounted on a common axis and movable along a common path, said hammers having recesses therein extending perpendicularly to said path and having surfaces complementary to opposite sides of said stock, said surfaces terminating in a common plane normal to the longitudinal axis of said stock, a rotatable drum having protruding elements for delivering simultaneous impacts to said hammers when said drum is rotated resulting in inwardly directed and opposite components of force, thereby engaging said recesses with said stock, means for rotating said drum, means for restraining movement of said hammers to substantially less than one quarter the distance between opposite sides of said stock and means for substantially instantaneously thereafter disengaging said surfaces of said hammers from said stock.

2. Apparatus according according to claim 1 in which the medial inner side surfaces of said hammers are overlapped and the overlapped portions thereof engage each other in a common plane that is normal to the longitudinal axis of said bar stock.

3. Apparatus according to claim 1 and means for advancing said elongated stock longitudinally a measured distance between impacts.

4. Apparatus according to claim 1 and impact transfer members removably positioned at the bases of said hammers and engageable by said radially protruding elements when in operative position for transferring impacts to said hammers.

5. Apparatus according to claim 1 in which the rotatable drum contains elements protruding from said drums radially a distance for displacing said hammers substantially less than one quarter the distance between opposite sides of said stock.

6. Apparatus for severing elongated stock comprising in combination a pair of offset, opposed bell crank impact hammers pivotally mounted on a common axis and movable along a common path normal to the longitudinal axis of said stock between a first position and a second position, said positions being spaced from each other a distance substantially less than one quarter of the thickness of said stock along the line of movement of said hammers, each of said hammers having an opening therein extending perpendicular to said path, said openings being slightly larger than a cross section of said stock and having surfaces complementary to opposite sides of said stock, said surfaces terminating in a common plane normal to the longitudinal axis of said stock, said openings being axially aligned with each other when said hammers are in said first position for reception of of said stock therethrough, a rotatable drum having protruding elements for delivering simultaneous impacts to said hammers when said drum is rotated resulting in inwardly directed and angular components of force for moving said hammers to said second position, means for rotating said drum, and means for substantially instantaneously thereafter returning said hammers to said first position whereby said stock is cleanly severed along said common plane.

7. Apparatus according to claim 6 and impact transfer members removably positioned at the bases of said hammers and engageable by said radially protruding elements when in operative position for transferring impacts to said hammers.

8. Apparatus according to claim 6 and resilient means for restraining the relative movement of said hammers upon such impacts to substantially less than one quarter of the material thickness of said stock.

References Cited
UNITED STATES PATENTS

| | | | |
|---|---|---|---|
| 1,349,915 | 8/1920 | Quast | 83—623 |
| 3,252,364 | 5/1966 | Veres et al. | 83—198 X |

WILLIAM S. LAWSON, *Primary Examiner.*